United States Patent [19]

Herfeld, deceased et al.

[11] Patent Number: 4,930,897

[45] Date of Patent: Jun. 5, 1990

[54] MIXER

[76] Inventors: Friedrich W. Herfeld, deceased, late of Neuenrade; Ute Herfeld, heir, Wall 1, 5982 Neuenrade, both of Fed. Rep. of Germany

[21] Appl. No.: 165,459

[22] Filed: Mar. 2, 1988

Related U.S. Application Data

[63] Continuation of Ser. No. 816,068, Jan. 3, 1986, abandoned.

[30] Foreign Application Priority Data

Jan. 25, 1985 [DE] Fed. Rep. of Germany ....... 3502557
Aug. 14, 1985 [DE] Fed. Rep. of Germany ....... 3529185

[51] Int. Cl.[5] .......................... B29B 7/14; B29B 7/16; B29B 7/26; B01F 7/20

[52] U.S. Cl. .......................................... 366/98; 366/92; 366/194; 366/197; 366/314; 366/320

[58] Field of Search ..................... 366/96, 97, 98, 189, 366/192, 205, 347, 68, 77, 247, 314, 69, 219, 92, 194, 197, 320; 222/567, 386, 387, 319; 241/285 A, DIG. 31, 282.1, 282.2

[56] References Cited

U.S. PATENT DOCUMENTS

| | | | |
|---|---|---|---|
| 1,355,478 | 10/1920 | Hudson | 366/68 |
| 1,458,282 | 6/1923 | Fairbanks | 222/387 X |
| 1,488,941 | 4/1924 | Roxs | 366/97 |
| 1,943,194 | 1/1934 | Vachoux | 366/286 X |
| 3,333,827 | 8/1967 | Lodige et al. | 366/97 |
| 3,421,741 | 1/1969 | Baechler | 366/98 |
| 3,651,768 | 3/1972 | Hyppola | 366/98 X |
| 4,061,275 | 12/1977 | Herfeld | 366/314 X |
| 4,300,841 | 11/1981 | Richards | 366/98 |
| 4,436,430 | 3/1984 | Mayer et al. | 366/98 X |
| 4,464,055 | 8/1984 | Mercatoris et al. | 366/40 X |
| 4,522,118 | 6/1985 | Simonsen et al. | 366/347 X |

FOREIGN PATENT DOCUMENTS

| | | | |
|---|---|---|---|
| 0055872 | 7/1982 | European Pat. Off. | 366/98 |

*Primary Examiner*—Harvey C. Hornsby
*Assistant Examiner*—Scott J. Haugland
*Attorney, Agent, or Firm*—Learman & McCulloch

[57] ABSTRACT

The invention relates to a mixer in which at least one end wall and at least one part of the peripheral wall can be moved relative to one another in such a way that the interior of the mixing vessel is freely accessible from the periphery. Such a mixer is distinguished by a very good cleaning facility.

17 Claims, 7 Drawing Sheets

MIXER

This is a continuation of co-pending application Ser. No. 816,068 filed on Jan. 3, 1986, now abandoned.

This invention relates to a mixer especially adapted for the mixing of plastics materials.

BACKGROUND OF THE INVENTION

In a known mixer of the type disclosed in the upper end wall which forms the lid of the vessel and the stirrer shaft can be raised relative to the fixed peripheral wall of the vessel by such a distance that the stirrer shaft with the mixing blades and the interior of the mixing vessel are accessible for cleaning.

The object of the present invention is to provide a mixer which retains the advantages of the known construction and improves upon it.

SUMMARY OF THE INVENTION

In the mixer according to the invention, relative movement between at least one end wall and at least one part of the peripheral wall renders the interior of the mixing vessel freely accessible from the periphery of the vessel, thereby facilitation/easy cleaning of the mixer. In spite of this significantly improved cleaning facility the mixer according to the invention is distinguished by a simple and compact construction.

THE DRAWINGS

Advantageous embodiments of the invention are illustrated in the accompanying drawings wherein:

FIG. 1 is a vertical section through a first embodiment of the mixer in the mixing position, FIG. 2 is a section through the mixer according to FIG. 1 in the cleaning position, FIG. 3 shows a side view of a second embodiment in which the left-hand half of the drawing is the mixer in the mixing position and the right-hand half shows the mixer in the cleaning position, FIGS. 4 and 5 are enlarged details in sectional views (detail VI in FIG. 3), FIG. 6 is a section through a further embodiment of the invention, FIG. 7 is a section through an embodiment which is a slight variant of that shown in FIG. 6, FIG. 8 is a section through a mixer according to the invention with a horizontal axis (in the mixing position), FIG. 9 is a section through a mixer according to FIG. 8 with the peripheral wall partially drawn back.

DETAILED DESCRIPTION

Figure 1:
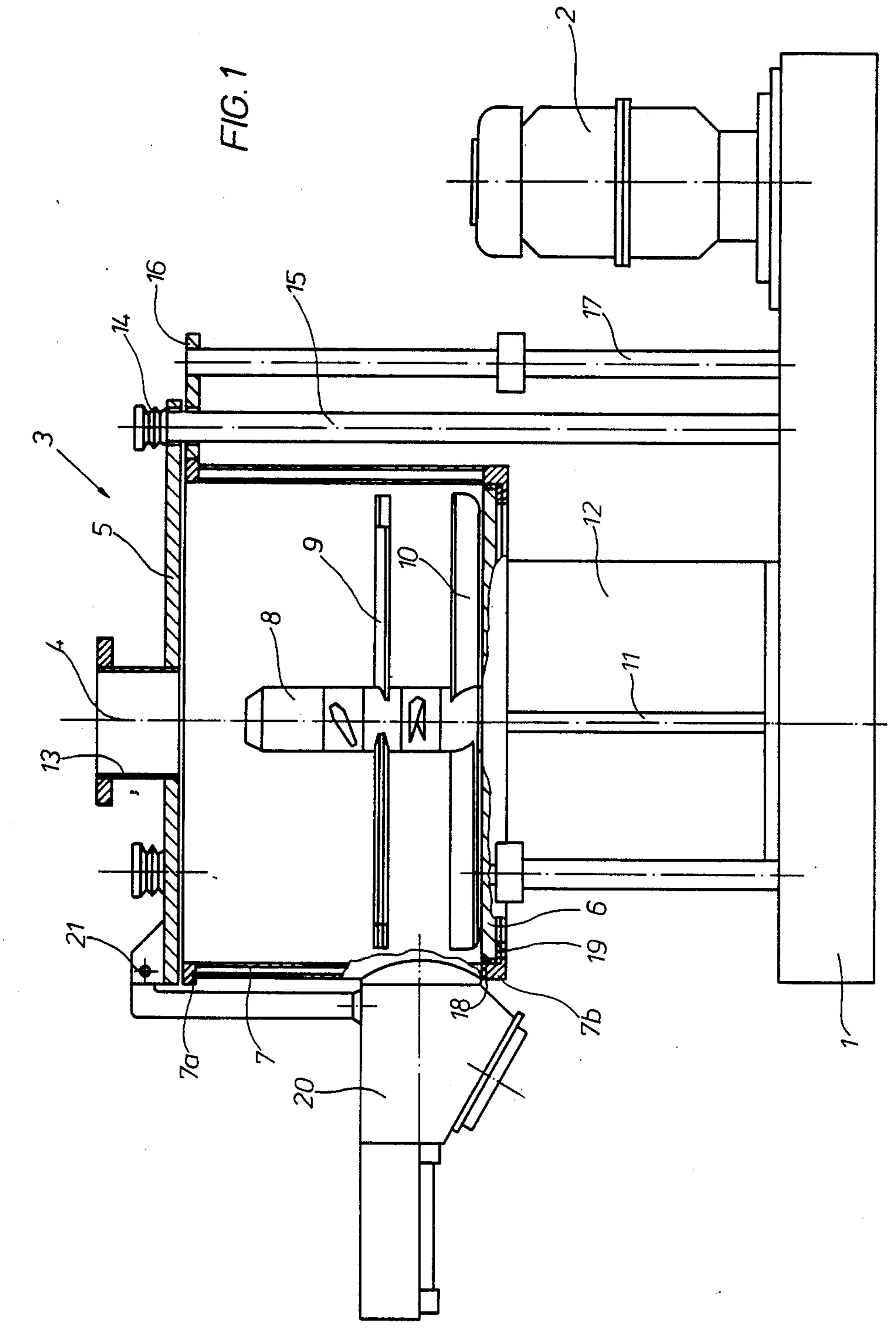

A first embodiment of the mixer which is intended in particular for preparations of plastics material will be explained first of all with the aid of FIGS. 1 and 2. On a stand 1 is mounted a mixer having a drive motor 2 and a cylindrical mixing vessel 3 with a vertical axis 4. The mixing vessel 3 consists essentially of a first end wall or cover 5, a second end wall or base 6 spaced from the cover 5 and a cylindrical peripheral wall 7. The cover 5 overlies the access opening to the mixing vessel which is opposite the base 6. The mixer also includes a stirrer shaft 8 which carries two groups of stirrer blades 9, 10 arranged one above another and is driven by the drive motor 2 via a shaft extension 11 (underneath or on the outer surface of the base 6) and a gear unit (not shown) which is accommodated in the stand 1.

The base 6 of the mixing vessel 3 is provided with a bearing (not shown) for the stirrer shaft 8, and is supported on the stand 1 of the mixer by means of a support 12.

The cover 5 of the mixing vessel, is provided with a feed opening 13 and is supported by compression springs 14 on a stationary support which in the illustrated embodiment is formed by a plurality of, preferably three, vertical rods 15 which are evenly distributed over the periphery of the vessel and connected to the stand 1. These rods pass through bores **5*a* in the vessel cover 5**.

The peripheral wall 7 of the mixing vessel 3 is provided on its upper edge with claws 16 which have bores **16*a* through which the rods 15 pass with sliding fit. In this way the rods 15 at the same time form guides for the raising and lowering movement of the peripheral wall 7**.

A lifting mechanism which includes a plurality of lifting elements 17 evenly distributed over the periphery of the vessel (only one such lifting element 17 is shown in the drawing) engages on the claws 16 of the peripheral wall 7. Each lifting element 17 can comprise for example a hydraulically or pneumatically actuated cylinder-piston rams. Naturally, however, other constructions of lifting mechanisms are also possible, for example screw spindles actuated by an electric motor.

Figure 2:
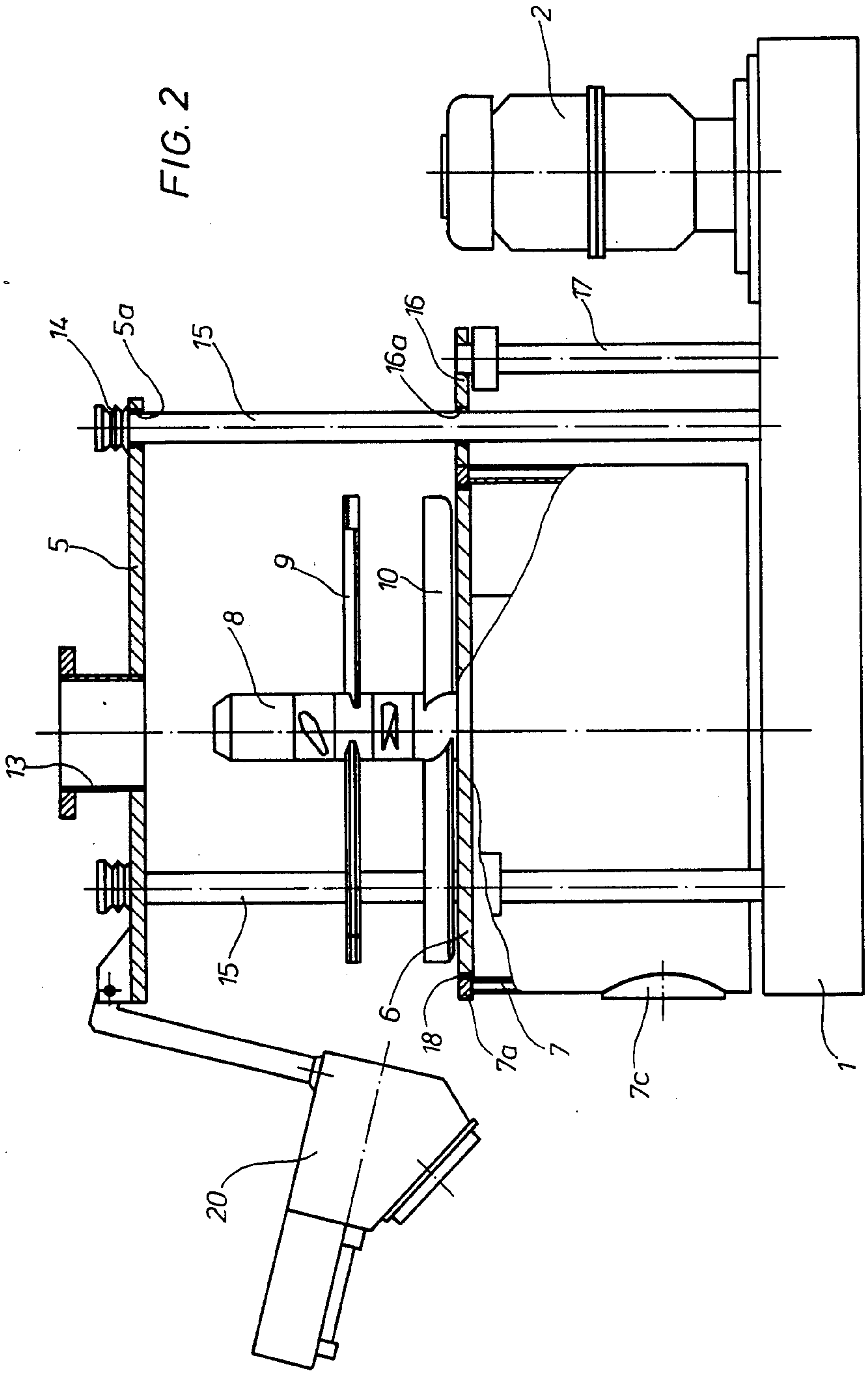

In embodiment of the mixer shown in FIGS. 1 and 2 the peripheral wall 7 of the mixing vessel 3 can be lowered relative to the vessel base 6 to such an extent that the interior of the mixing vessel 3 is freely accessible from the periphery of the vessel (cf. FIG. 2). Advantageously the peripheral wall is held so as to be lowered (moved) to such an extent that the upper edge **7*a* of the peripheral wall 7 is located at the level of the vessel base 6 in the fully lowered position (cf. FIG. 2). A sliding fit is advantageously provided between the fixed vessel base 6 and the peripheral wall 7 particles of the product adhering to the peripheral wall 7 are scraped off on the edge of the vessel base 6 during movement lowering of the peripheral wall. In the embodiment according to FIGS. 1 and 2 a sliding and sealing element 18 is indicated for this purpose on the outer periphery of the vessel base 6**.

The peripheral wall 7 of the mixing vessel is shouldered at the shoulder **7*b* (cf. FIG. 1), and this lower end 7*b* of the peripheral wall 7 butts against the underside of the vessel base 6 via a sealing element 19 when the wall 7** is in the raised position.

A further sealing element which is not shown in the drawings can be provided between the upper edge **7*a* of the peripheral wall 7 and the underside of the vessel cover 5**.

In the working or mixing position the shoulder **7*b* of the peripheral wall 7 butts against the vessel base 6 and the upper edge 7*a* of the wall 7 butts against vessel cover 5 under the force of the lifting elements 17, and the vessel cover 5 is easily raised against the force of the compression springs 14. By means of the lifting elements 17 the peripheral wall 7 can be lowered out of the working position illustrated in FIG. 1 into the cleaning position shown in FIG. 2, i.e. the peripheral wall 7 of the vessel may be moved downwards relative to the vessel base 6**.

The peripheral wall 7 of the vessel is provided with an outlet opening **7*c* with which an outlet housing 20 is movable into and out of register. The housing 20 is mounted on the cover 5 of the mixing vessel so as to be pivotable about a horizontal axis 21. In the mixing or working position (FIG. 1) the outlet housing 20 is in register with the outlet opening 7***c* and seals it. When the peripheral wall 7 of the vessel 3 is to be lowered, then first of all the outlet housing 20 is moved sideways a little (cf. the position of the outlet housing in FIG. 2).

It will be recognised that for cleaning of the mixing vessel it is not necessary to remove a feed pipe that may be connected to the feed opening 13 of the cover 5 furthermore the peripheral wall 7 is lowered, i.e. moved into a space which usually exists in any case above the stand 1, no additional space above the mixer is required for cleaning of the mixing vessel 3.

The cleaning of the peripheral wall 7 of the mixing vessel 3 is carried out largely automatically on lowering of the wall by scraping off particles of the product on the edge of the base 6. The interior cleaning of the vessel 3, in particular the cleaning of the stirrer shaft 8 and the mixing blades 9 and 10, can be carried out very easily when the peripheral wall 7 is lowered, since free accessibility is ensured from all sides.

The guiding of the peripheral wall 7 by a plurality of rods 15 distributed over the periphery and the use, a plurality of, of at least two—lifting elements 17 evenly distributed over the periphery of the vessel ensure that even with a very small gap between the vessel base 6 and the peripheral wall 7, raising and lowering of the peripheral wall 7 without tipping and jamming is achieved.

The guiding and lifting structure illustrated in FIGS. 1 and 2 makes it possible to dispense with further arrangements for closing and gripping the mixing vessel 3 by manual, hydraulic or pneumatic means. Since in the embodiment of the mixer described above it is not necessary for cleaning of the vessel for the feed pipe connected above the cover to be removed, nor for individual parts of the machine to be moved sideways, this mixer is also particularly suitable for use with automatic feeding apparatus.

Figure 4:
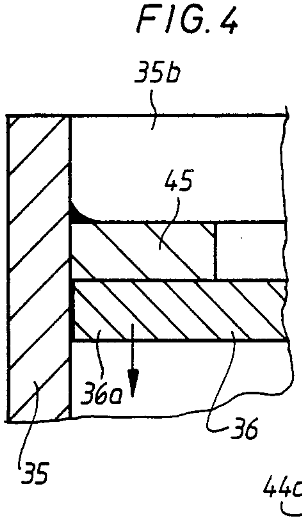
Figure 3:
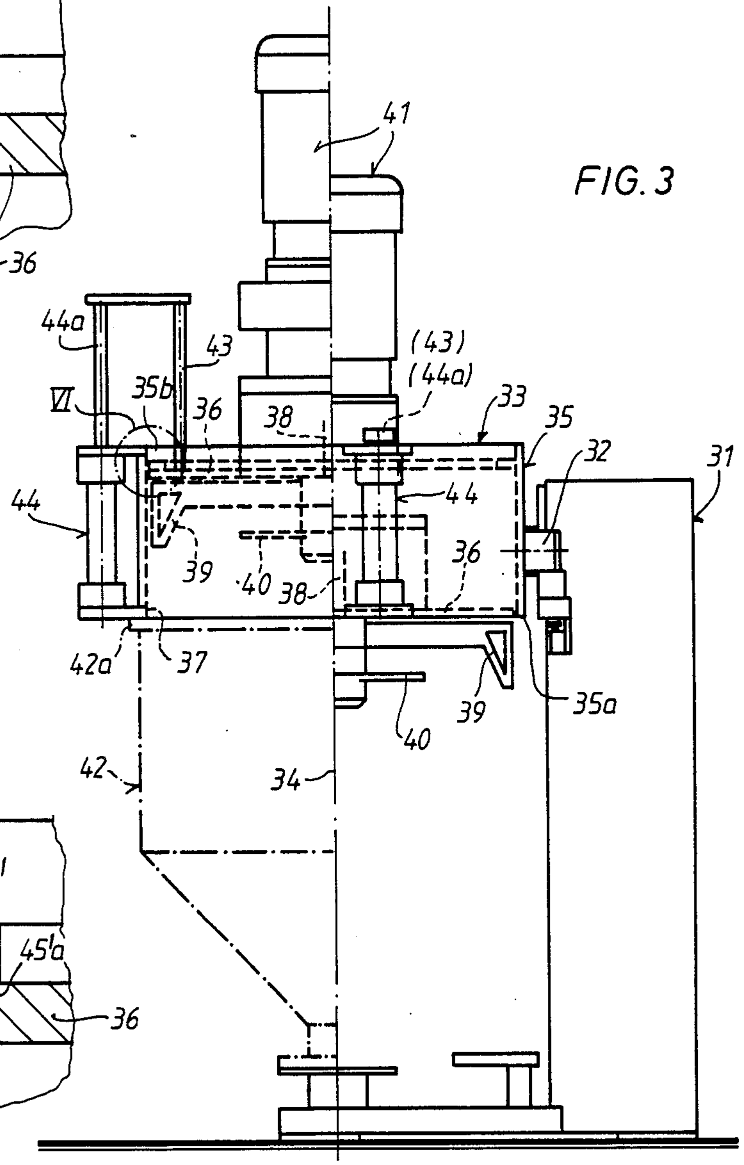
Figure 5:
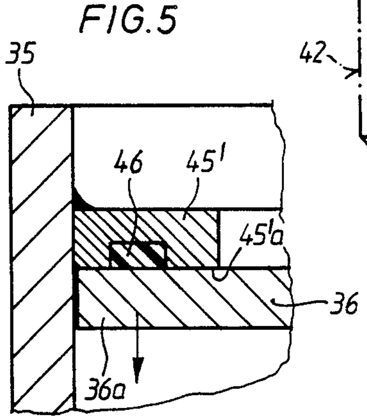

Whereas in the first embodiment shown in FIGS. 1 and 2 the peripheral wall of the vessel can be moved relative to and the vessel base 6, whereas the stirrer shaft 8, the stirrer blades 9 and 10, the shaft extension 11 and the drive motor 2 are arranged as an immovable stationary unit on the stand 1, it is also possible for the movement of the peripheral wall of the vessel and the vessel base relative to one another to be brought about by the vessel base being movable inside the peripheral wall of the vessel which is held fixed, as is explained in greater detail below in connection with the embodiment according to FIGS. 3 to 5.

The mixer of this second embodiment has a vertical stand 31 with a supporting journal 32 pivotally mounted in its head region. This supporting journal 32 supports the actual mixing vessel 33 which has a vertical axis 34, a substantially cylindrical peripheral wall 35, a flat base 36 and an access opening 37 opposite this base 36.

A stirrer shaft 38 which passes through the vessel base 36 and is only indicated by broken lines is arranged coaxially with the vessel axis 34 and bears the mixing blades 39 and 40. In this case a geared motor 41 which serves for rotary drive of the stirrer shaft 38 is flanged directly on the outer surface of the vessel base 36.

In the embodiment of FIG. 3 the mixing blades 39 which are arranged near the vessel base 36 are essentially adapted to the shape of the base 36, so that they sweep over the peripheral wall 35 and the base 36 of this mixing vessel 33 with a small clearance.

In the region of the access opening 37 the outer edge 35*a* of the cylindrical peripheral wall 35 is constructed in such a way that the upper outer edge 42*a* of a transport vessel 42, indicated by dash-dot lines in the left-hand half of FIG. 3, can be fixed so as to form a seal. This transport vessel 42 holds material to be mixed and in the position shown in the left-hand half of FIG. 3 it can be raised by means of a known lifting device which is not shown in greater detail and pushed against the outer edge 35*a* of the peripheral wall (in order to fix it thereto), whilst after the mixing operation is finished it can be lowered again and transported away. When the transport vessel 42 is firmly connected to the mixing vessel 33 in the manner indicated above, the whole arrangement (i.e. the mixing vessel 33 including the mixing blades and drive motor and the transport vessel 42 connected to the mixing vessel) is pivoted about the supporting journal 32 by 180° into a mixing position which is not shown in the drawing but it will be understood that in the mixing position the transport vessel 42 is located at the top and the mixing vessel 33 at the bottom, in contrast to FIG. 3. The material to be mixed then falls out of the transport vessel 42 into the actual mixing vessel 33, which can for example be of such dimensions that it can hold all of the material in order to achieve thorough mixing of this material. After the mixing operation is finished the arrangement is pivoted back by 180° about the supporting journal 32 so that the mixed material falls back into the transport vessel 32 and the latter can be detached and removed.

As a result of the construction and arrangement in particular of the mixing blades 39 it is possible to ensure that the walls of the mixing vessel 33 are kept thoroughly clean. However, in such mixers it is necessary more or less frequently (particularly in the case of a change of products) for the whole interior of the mixer to be completely cleaned. Whereas in the embodiment of FIGS. 1 and 2 the peripheral wall can be moved or lowered relative to the vessel base, in the embodiment of the mixer illustrated in FIG. 3 the peripheral wall 35, apart from its pivoting about the supporting journal 32, held stationary and by contrast the vessel base 36 is movable inside the peripheral wall 35 of the vessel so that the interior of the mixing vessel 33 is freely accessible from the periphery of the vessel in an almost identical manner to that of the first embodiment.

The vessel base 36 is mounted on a plurality of retaining rods 43 of which only one is shown for the sake of clarity in the left-hand half of FIG. 3. These retaining rods 43 are preferably evenly distributed over the periphery of the vessel and parallel to the vessel axis 34. In addition a plurality of lifting devices 44, which also are evenly distributed over the outer surface of the peripheral wall 35 of the vessel, are connected to the retaining rods 43 in such a way that they are the vessel base 36 supported thereby can be moved along the vessel axis 34. The lifting devices 44 are preferably formed by cylinder-piston rams 44 actuated by a pressure medium (hydraulically or pneumatically) in which the piston rods 44*a* run parallel to the vessel axis 34 and are connected to the retaining rods 43 so as to be fixed against displacement. As can be seen from the left-hand half of FIG. 3 the retaining rods 43 and the piston rods 44*a* each provide a sort of retaining and guiding rod system for the axial movement of the vessel base 36, and the lifting devices 44 are attached in a simple manner directly onto the outer surface of the peripheral wall 35.

As has already been indicated above, in the left-hand half of FIG. 3 the vessel base 36 is located in its upper position before the whole arrangement is pivoted about the supporting journal 32 or after the arrangement is pivoted back after the mixing operation, whereas according to the representation in the right-hand half of FIG. 3 the vessel base 36, together with the mixing blades 39, 40 and the geared motor 41, is moved axially downwards relative to the peripheral wall 35 to its lower position. This movability of the vessel base 36 relative to the peripheral wall 35 is chosen to be of such magnitude that, as in the embodiment according to FIGS. 1 and 2, the outer edge 35*a* of the access opening 37 of the peripheral wall 35 of the vessel and the vessel base 36 are located at approximately the same height. The inner surface of the base 36 preferably stops flush with the outer edge 35*a* of the peripheral wall 35, which results in particularly good cleaning. In this cleaning position the mixing blades 39, 40 project downwards beyond the peripheral wall 35, so that they are freely accessible from all sides. In this case too the space below the mixing vessel 33 can be used for moving out the mixing blades 39, 40.

Furthermore, in the embodiment according to FIG. 3 it is also advantageous to provide a sliding fit between the movable vessel base 36 and the inner surface of the peripheral wall 35 of the vessel in order thereby to achieve automatic cleaning of the inner surface of the peripheral wall 35 when the vessel base 36 is lowered, as has already been explained in detail above with respect to the first embodiment.

It is, moreover, particularly advantageous if the vessel base 36 in its working position rests with its outer peripheral wall 36*a* (cf. FIG. 4) tight against a ring flange 45 which projects radially inwards from the peripheral wall 35 of the vessel and is provided at the end 35*b* of the peripheral wall 35 opposite the vessel access opening 37. If in this case the vessel base 36 is of flat construction at least in the region of its outer peripheral edge 36*a* (and the side of the ring flange 45 facing it is of corresponding construction), then a particularly good level and tight abutment of the base 36 is produced in the working position.

This base sealing illustrated in FIG. 4 can be varied, as shown in FIG. 5, by inserting a sealing ring 46 made from suitable resilient sealing material formed of rubber or appropriate plastics material on the surface 45'*a* of the ring flange 45' which confronts the base 36.

In addition to the possibilities described above for effecting sealing between the vessel base 36 and the peripheral wall 35 of the vessel, a sealing ring which co-operates with the inner surface of the peripheral wall 35 can also be provided on the outer peripheral edge of the base 36.

In the two embodiments described above the relative movability between the peripheral wall of the vessel and the vessel base has been described in one case in a mixer construction with a non-pivotable mixing vessel and in the other case in a mixer construction with a mixing vessel which is pivotable about a supporting journal. However, combinations of these two different constructions can be undertaken with appropriate adaptation of the movable part. Thus for example a mixer construction like that of FIGS. 1 and 2 can have a mixing vessel with a peripheral wall which is fixed, i.e. not movable and not pivotable, but has a base which is axially movable relative thereto in order to make the interior of the vessel freely accessible from the periphery for cleaning purposes.

Figure 6:
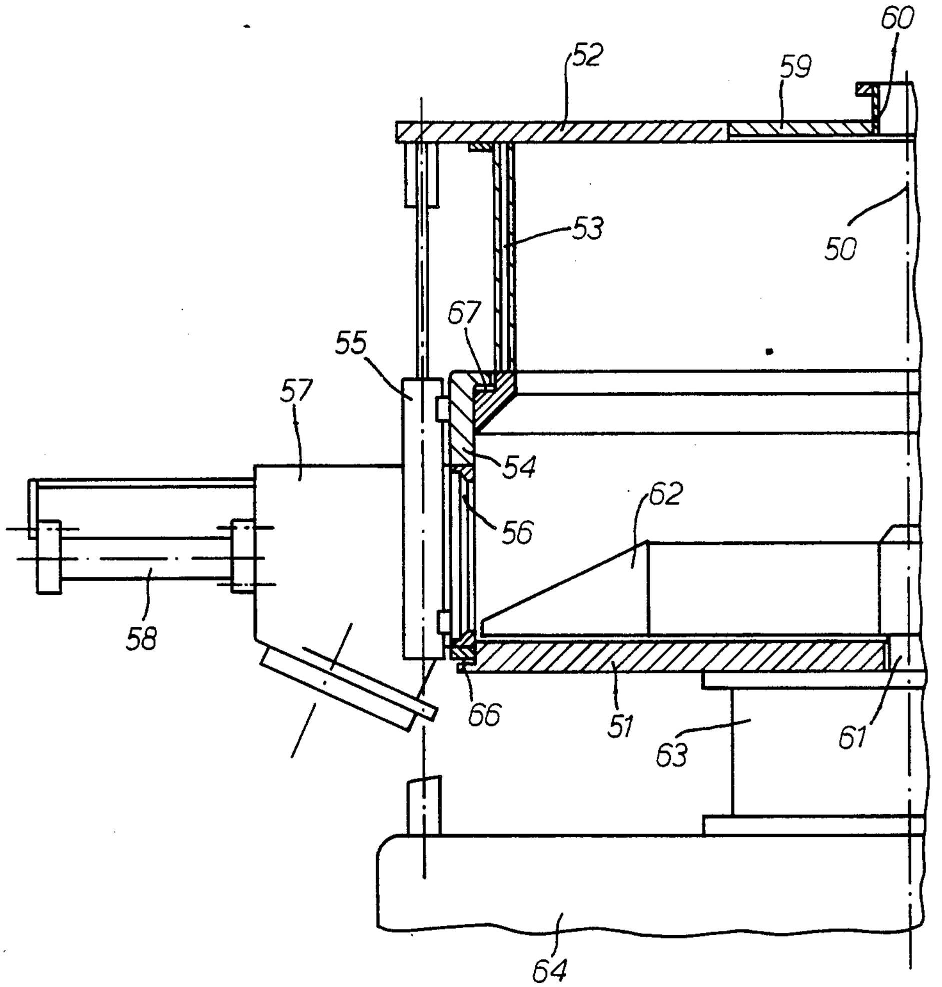

In the further embodiment shown in FIG. 6 the mixing vessel has a vertical axis 50 and includes a base 51, a cover 52 and a cylindrical peripheral wall which is composed of parts 53 and 54.

The base 51, the cover 52 and the part 53 of the peripheral wall which is firmly connected to the cover 52 are stationary. The lower part 54 of the peripheral wall is vertically movable relative to the base 51, cover 52 and part 53. The movement is produced by lifting elements 55 which are evenly distributed over the periphery.

The movable lower part 54 of the peripheral wall is provided with an outlet opening 56 to which an outlet housing 57 and a lifting element 58 for a moving device located in the outlet housing 57 are connected. The outlet housing 57 and the parts supported thereon are entrained during the vertical movement of the lower part 54 of the peripheral wall.

The cover 52 of the mixing vessel is provided with a pivotable closure 59 in which a feed opening 60 is arranged.

The stirrer shaft 61 passes through the base 51 and bears mixing blades 62. The drive 63 for the stirrer shaft 61 is supported on the stand 64. The cover 52 is connected to the stand 64 by supports 65.

In the mixing position shown in FIG. 6 (with the lower part 54 of the peripheral wall lowered), sealing elements 66, 67 respectively ensure a reliable seal between the part 54 of the peripheral wall and the base 51 and between the parts 53 and 54 of the peripheral wall.

For cleaning, the lower part 54 of the peripheral wall is raised by means of the lifting elements 54 so that the mixing blades 62 and the base 51 of the mixing vessel are easily accessible from the periphery of the vessel.

Figure 7:
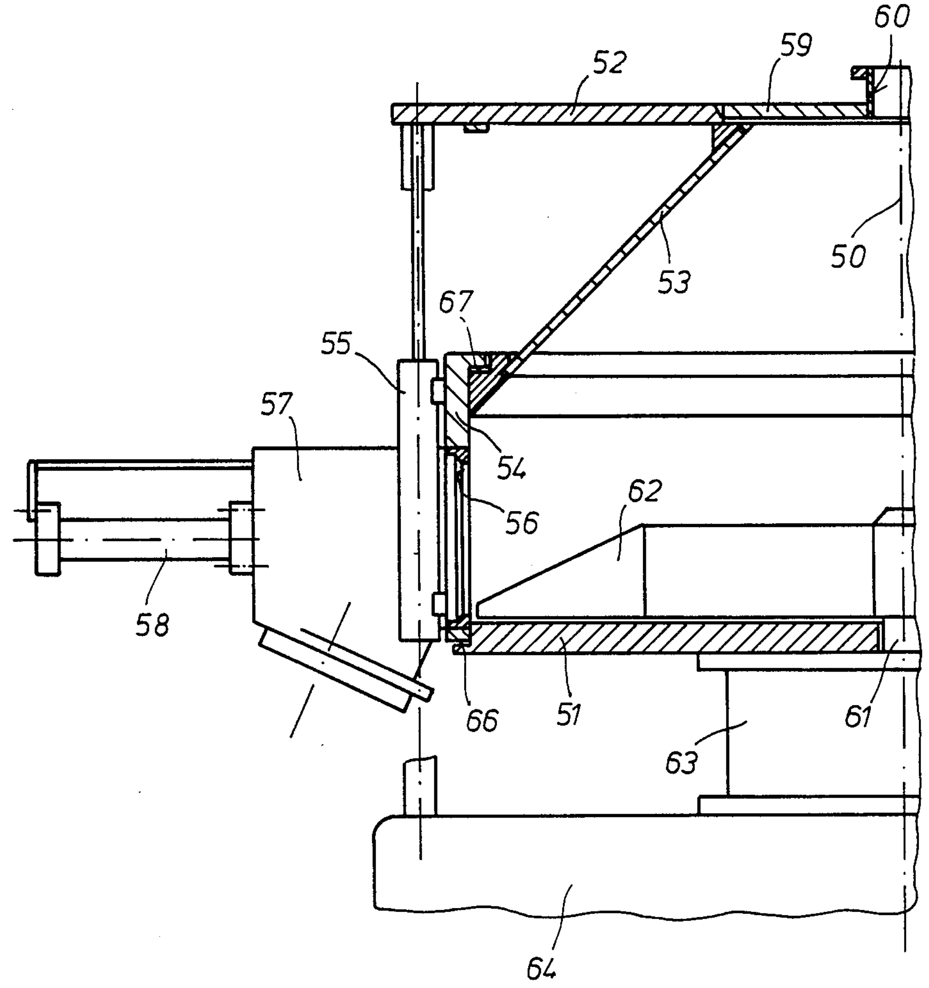

The variant illustrated in FIG. 7 largely corresponds to the construction shown in FIG. 6. The upper part 53 of the peripheral wall in this embodiment, however, is of conical construction. In this way the inner surface of the lower part 54 of the peripheral wall also remains accessible in the raised position, which simplifies cleaning particularly in the region of the outlet opening 56.

The division of the peripheral wall in the embodiments according to FIGS. 6 and 7 can be varied to a large extent. However, it is essential that the lower part 54 have a height at least as great as the diameter of the outlet opening 56, so that the outlet opening can be raised undivided with the lower part 54 of the peripheral wall.

Figure 8:
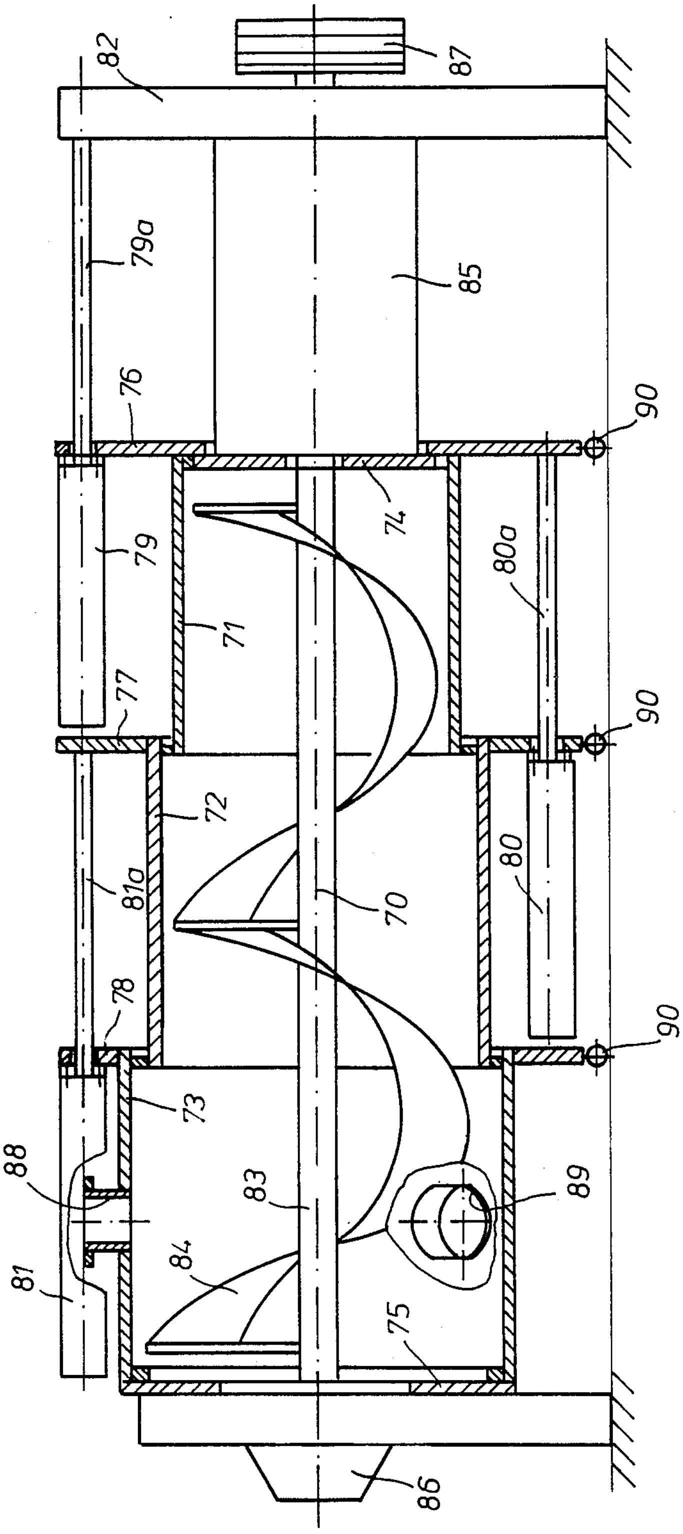
Figure 9:
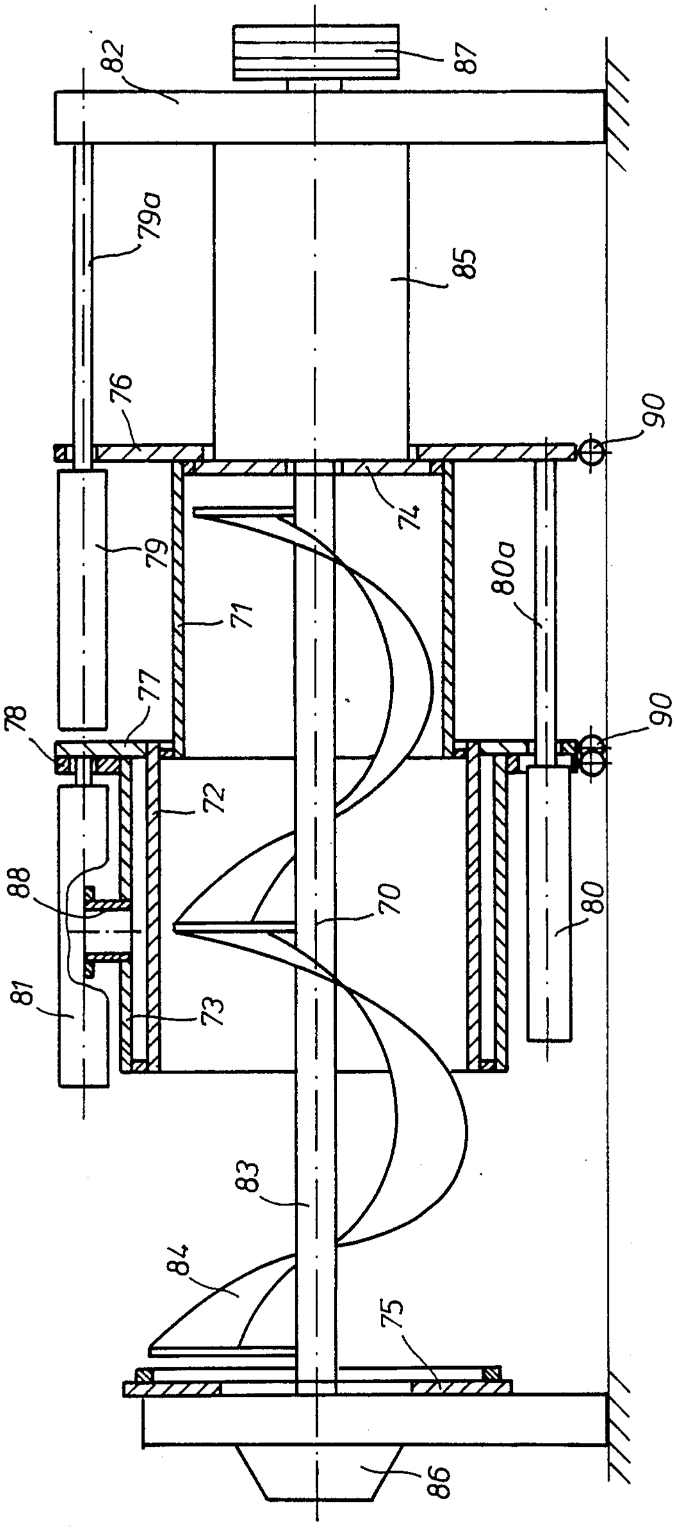

FIGS. 8 and 9 show an embodiment in which the axis 70 of the mixing vessel is horizontal. In this embodiment the peripheral wall of the mixing vessel consists of three parts 71, 72, 73 which can be telescoped into one another. Together with the two fixed end walls 74, 75 they form the mixing vessel.

The parts 71, 72 and 73 of the peripheral wall are each connected at their right-hand end to a flange 76, 77 and 78 respectively. These flanges support lifting elements 79, 80, 81. The piston rod 79*a* of the lifting element 79 is mounted on a stationary support 82, the piston rod 80*a* of the lifting element 80 on the flange 76 and the piston rod 81*a* of the lifting element 81 on the flange 77.

The stirrer shaft 83 which bears the stirrer blades 84 is mounted in bearings 85, 86 and is driven by a drive 87.

In the mixing position shown in FIG. 8 the parts 71, 72, 73 of the telescoping peripheral wall are shown in the fully extended state. The interior of the mixing vessel is closed to the exterior, and sealing elements indicated generally, ensure the necessary seal between the three parts of the peripheral wall and the two end walls.

If the mixing vessel is to be cleaned, the parts 71, 72 and 73 are telescoped into one another. FIG. 9 shows the intermediate position in which the part 73 of the peripheral wall is telescoped with the part 72. If all three parts 71, 72, 73 are moved towards the right into the region surrounding the bearing 85, the stirrer blades 84 are easily accessible for cleaning from outside over their whole length.

The part 73 of the peripheral wall is provided with an inlet opening 88 and an outlet opening 89 in the illustrated embodiment. The flanges 76, 77, 78 are supported on the base by means of rollers 90.

I claim:

1. In a mixer adapted for mixing plastics materials comprising:

(a) a mixing vessel having a peripheral wall;

(b) an end wall at each end of said peripheral wall for defining with the latter an enclosed mixing chamber between said walls, said peripheral wall defining the side of said chamber;

(c) a rotatable stirrer shaft extending into said chamber and bearing mixing blades for mixing materials in said chamber; and (d) rotary drive means coupled to said stirrer shaft for rotating the latter and said blades;

the improvement comprising:

(e) means mounting said peripheral wall and one of said end walls for relative movement therebetween axially of said chamber a distance sufficient to provide an opening into said chamber from the periphery of said chamber and enable access to said blades and to the interior of said chamber through said side of said chamber;

(f) means for effecting said relative movement of said peripheral wall and said one of said end walls through said distance; and (g) sealing and scraping means reacting between said peripheral wall and said one of said end walls for providing therebetween a seal during mixing and a scraper for the interior of said peripheral wall during said relative movement of the latter and said one of said end walls.

2. Mixing apparatus comprising a vessel having a first end wall, a second end wall, means spacing said end walls from one another, and a peripheral wall of such length as to span said end walls and form between the latter a closed mixing chamber having a central axis; rotatable mixing blades interposed between said end walls; drive means connected to said blades for rotating them; and means for effecting simultaneous relative movement between said peripheral wall and both of said end walls linearly axially of said chamber a distance sufficient to provide access to said chamber from its periphery.

3. Apparatus according to claim 2 wherein said peripheral wall is movable and said end walls are fixed.

4. Apparatus according to claim 2 wherein the peripheral wall has an outlet opening; an outlet housing; and means mounting said housing for movement into and out of register with said opening.

5. Apparatus according to claim 2 wherein the peripheral wall has an outlet opening, an outlet housing in register with said opening, and means securing said housing on the peripheral wall.

6. Apparatus according to claim 2 wherein said peripheral wall and said end walls are relatively movable to a position in which said peripheral wall has one edge thereof level with one of said end walls.

7. Apparatus according to claim 2 wherein the peripheral wall of the mixing vessel is formed of at least two parts one of which parts is axially movable relative to the others.

8. Apparatus according to claim 7 wherein the parts of said peripheral wall are cylindrical.

9. Apparatus according to claim 7 wherein one of said parts of said peripheral wall is conical.

10. Apparatus according to claim 7 wherein the movable part of said peripheral wall has an outlet opening therein.

11. Apparatus according to claim 2 wherein the axis of said chamber is substantially vertical.

12. Apparatus according to claim 2 wherein the axis of said chamber is substantially horizontal.

13. Apparatus according to claim 2 wherein the means for effecting said relative movement comprises a plurality of rams evenly distributed over the periphery of the mixing vessel.

14. Apparatus according to claim 2 including scraping means reacting between said peripheral wall and one of said end walls for scraping the interior of said peripheral wall during movement thereof relative to said one of said end walls.

15. Apparatus according to claim 2 wherein said peripheral wall is in telescoping relation with one of said end walls.

16. Apparatus according to claim 15 including scraping and sealing means carried by said one of said end walls in engagement with the interior surface of said peripheral wall.

17. Mixing apparatus comprising a peripheral wall; a first end wall snugly and slideably accommodated within said peripheral wall at one end thereof; scraping means carried by said first end wall in engagement with the interior surface of said peripheral wall; a second end wall at the opposite end of said peripheral wall and forming with the latter and said first end wall a mixing chamber having a central axis; mixing blades accommodated within said chamber; driving means coupled to said blades and extending through said first end wall for driving said blades; and means for effecting relative movement between said end walls and said peripheral wall axially of said chamber through a distance sufficient to enable access to said chamber and said blades from the periphery of said chamber and in such direction as to enable said scraping means to clean at least a portion of the interior surface of said peripheral wall.

* * * * *

UNITED STATES PATENT AND TRADEMARK OFFICE

CERTIFICATE OF CORRECTION

PATENT NO. : 4,930,897

DATED : June 5, 1990

INVENTOR(S) : Friedrich W. Herfeld

It is certified that error appears in the above-identified patent and that said Letters Patent is hereby corrected as shown below:

Column 1, line 10, after "in" insert --European Patent Specification No. 1-55872 --; line 25, change "facilitation/" to -- facilitating --; line 38, change "shows" to -- is --; line 39, change "is" to -- shows --; line 47, cancel "slight"; line 61, after "7", insert -- which telescopes over the base --.

Column 2, line 39, change "movement lowering" to -- lowering movement --; line 45, change "shoulder" to -- lower end --; same line, change "lower end" to -- shoulder --.

Column 3, line 8, after "5" insert a period; line 9, change "furthermore" to -- Furthermore --; bridging lines 22 and 23,

UNITED STATES PATENT AND TRADEMARK OFFICE

CERTIFICATE OF CORRECTION

PATENT NO. : 4,930,897
DATED : June 5, 1990
INVENTOR(S) : Friedrich W. Herfeld

It is certified that error appears in the above-identified patent and that said Letters Patent is hereby corrected as shown below:

change "use, a plurality of, of at least two -" to --use of a plurality, at least two, of --; line 24, after "that" insert a comma; line 41, cancel "and".

Column 4, line 22, after "to" (first occurrence) insert -- the arrangement shown in --.

Column 6, line 34, change "54" to -- 55 --.

Signed and Sealed this

Third Day of March, 1992

Attest:

HARRY F. MANBECK, JR.

*Attesting Officer*

*Commissioner of Patents and Trademarks*